US012325652B2

(12) United States Patent
Schott et al.

(10) Patent No.: US 12,325,652 B2
(45) Date of Patent: Jun. 10, 2025

(54) METHOD, SYSTEM AND STABLE FOR PHOSPHATE RECOVERY FROM A WASTE STREAM

(71) Applicant: Koninklijke Oosterhof-Holman Beheer B.V., Grijpskerk (NL)

(72) Inventors: Christopher Schott, Leeuwarden (NL); Jorge Ricardo Apolinaro Macedo Bachert Da Cunha, Leeuwarden (NL); Renata Doroethea Van Der Weijden, Leeuwarden (NL); Cees Jan Nico Buisman, Leeuwarden (NL)

(73) Assignee: KONINKLIJKE OOSTERHOF-HOLMAN BEHEER B.V., Grijpskerk (NL)

( * ) Notice: Subject to any disclaimer, the term of this patent is extended or adjusted under 35 U.S.C. 154(b) by 430 days.

(21) Appl. No.: 17/793,169

(22) PCT Filed: Jan. 22, 2021

(86) PCT No.: PCT/NL2021/050039
§ 371 (c)(1),
(2) Date: Jul. 15, 2022

(87) PCT Pub. No.: WO2021/150112
PCT Pub. Date: Jul. 29, 2021

(65) Prior Publication Data
US 2023/0059525 A1 Feb. 23, 2023

(30) Foreign Application Priority Data
Jan. 23, 2020 (NL) .................................. 2024746
Apr. 21, 2020 (NL) .................................. 2025387

(51) Int. Cl.
*C02F 9/00* (2023.01)
*C01B 25/26* (2006.01)
(Continued)

(52) U.S. Cl.
CPC ................ *C02F 9/00* (2013.01); *C01B 25/26* (2013.01); *C01B 25/265* (2013.01); *C05F 3/00* (2013.01);
(Continued)

(58) Field of Classification Search
CPC ...... C02F 9/00; C02F 1/20; C02F 1/74; C02F 3/28; C02F 3/341; C02F 11/04;
(Continued)

(56) References Cited

U.S. PATENT DOCUMENTS 4,318,993 A * 3/1982 Ghosh .................... C12M 21/04
210/603
7,452,465 B2 * 11/2008 Le .......................... C02F 11/185
210/603

(Continued)

FOREIGN PATENT DOCUMENTS

| DE | 102016122869 | 5/2018 |
| EP | 3398913 | 11/2018 |
| WO | 2018067631 | 4/2018 |

OTHER PUBLICATIONS

Machine-generated English translation of EP 3398913, generated on Nov. 11, 2024.*
(Continued)

*Primary Examiner* — Fred Prince
(74) *Attorney, Agent, or Firm* — MH2 Technology Law Group, LLP

(57) ABSTRACT

The invention relates to a method and system for phosphate recovering from a waste stream, such as an animal manure waste stream. The method comprises the steps of: providing a tank reactor; 5 providing acidogenic bacteria and/or acetogenic bacteria and the waste stream to the tank reactor, hydrolysing the waste stream, forming a reaction mixture; providing a gas flow to the reaction mixture for removing
(Continued)

carbon dioxide from the reaction mixture; 10 providing the reaction mixture to an anaerobic sludge reactor, removing a compound comprising phosphate from the reaction mixture within the anaerobic sludge reactor, and removing gas from the reaction mixture within the anaerobic sludge reactor.

20 Claims, 4 Drawing Sheets

(51) Int. Cl.
| | |
|---|---|
| C02F 11/04 | (2006.01) |
| C02F 11/12 | (2019.01) |
| C02F 11/18 | (2006.01) |
| C05F 3/00 | (2006.01) |
| C05F 17/10 | (2020.01) |
| C05F 17/40 | (2020.01) |
| C05F 17/50 | (2020.01) |
| C02F 1/20 | (2023.01) |
| C02F 1/74 | (2023.01) |
| C02F 3/28 | (2023.01) |
| C02F 3/34 | (2023.01) |
| C02F 11/125 | (2019.01) |
| C02F 11/126 | (2019.01) |
| C02F 11/145 | (2019.01) |
| C02F 101/10 | (2006.01) |
| C02F 101/16 | (2006.01) |
| C02F 103/20 | (2006.01) |

(52) U.S. Cl.
CPC .............. *C05F 17/15* (2020.01); *C05F 17/40* (2020.01); *C05F 17/50* (2020.01); *C02F 1/20* (2013.01); *C02F 1/74* (2013.01); *C02F 3/28* (2013.01); *C02F 3/341* (2013.01); *C02F 11/04* (2013.01); *C02F 11/125* (2013.01); *C02F 11/126* (2013.01); *C02F 11/145* (2019.01); *C02F 11/18* (2013.01); *C02F 2101/101* (2013.01); *C02F 2101/105* (2013.01); *C02F 2101/16* (2013.01); *C02F 2103/20* (2013.01); *C02F 2209/02* (2013.01); *C02F 2209/06* (2013.01); *C05F 17/10* (2020.01); *Y02A 40/20* (2018.01); *Y02E 50/30* (2013.01); *Y02P 20/145* (2015.11); *Y02W 30/40* (2015.05)

(58) Field of Classification Search
CPC ..... C02F 11/125; C02F 11/126; C02F 11/145; C02F 11/18; C02F 2101/101; C02F 2101/105; C02F 2101/16; C02F 2103/20; C02F 2209/02; C02F 2209/06; C01B 25/26; C01B 25/265; C05F 3/00; C05F 17/15; C05F 17/40; C05F 17/50; C05F 17/10; Y02A 40/20; Y02E 50/30; Y02P 20/145; Y02W 30/40
USPC ........ 210/609, 612, 613, 631, 906, 907, 259
See application file for complete search history.

(56) References Cited

U.S. PATENT DOCUMENTS 9,822,024 B2 * 11/2017 Meng .................... C02F 1/5254
2011/0136213 A1 * 6/2011 Stewart .................. C12P 5/023
435/303.2

OTHER PUBLICATIONS

Machine-generated English translation of DE 102016122869, generated on Nov. 11, 2024.*

* cited by examiner

METHOD, SYSTEM AND STABLE FOR PHOSPHATE RECOVERY FROM A WASTE STREAM

The present invention relates to a method, system, and stable for phosphate recovery from a waste stream, such as an animal manure waste stream. For example, the method recovers phosphate from an animal waste stream which is produced in a stable by livestock, or from an industrial wastewater and/or concentrated toilet water.

It is known from practice to remove phosphorus from waste streams to prevent eutrophication in effluent receiving surface waters and/or farmlands. Conventional techniques include enhanced biological phosphorus removal (EBPR) and chemical phosphorus removal (CPR).

Conventional phosphorus recovery from waste streams involves the production of struvite in EBPR plants and/or phosphorus recovery from sludge ash. It is known that struvite precipitation enables recovery of phosphorus. However, the efficiency to recover phosphorus as struvite is typically only in the range of 10-50% of the total influent phosphorus load. Also, struvite precipitation is limited to plants using EBPR. Incineration involving recovery of phosphorus from sludge ash is relatively expensive. Also, sludge can be applied to agricultural land. However, there are areas with agricultural land that have a surplus of phosphorus due to manure surpluses. Also, the elemental composition of sludge/manure may not match with crop demand.

An additional problem with the waste stream, such as an animal manure waste stream, is that these are often highly toxic due to chemical reactions of the animal manure within the waste stream. This problem is even bigger for large scale animal manure waste streams.

An objective of the present invention is to provide a method for phosphate/phosphorus recovery from a waste stream, such as an animal waste stream, that obviates or least reduces the aforementioned problems and is more effective and/or efficient as compared to conventional methods.

This objective is achieved with the method for phosphate recovering from a waste stream, such as an animal manure waste stream, wherein the method comprises the steps of:
providing a tank reactor;
providing acidogenic bacteria and/or acetogenic bacteria and providing the waste stream to the tank reactor;
hydrolysing the waste stream, and forming a reaction mixture with a compound comprising phosphate;
providing a gas flow to the reaction mixture for removing carbon dioxide from the reaction mixture;
providing the reaction mixture to an anaerobic sludge reactor;
removing the compound comprising phosphate from the reaction mixture within the anaerobic sludge reactor; and
removing gas from the reaction mixture within the anaerobic sludge reactor.

Streams, in particular waste streams, may comprise phosphate ($PO_4^{3-}$) as the main molecule of interest in the relevant streams that comprise phosphorus (P). These streams relate to (wet) waste water flows, sewage, animal manure or other waste streams. It is noted that the method according to the invention enables recovery of compounds comprising phosphorus preferably without adding initial compounds comprising phosphorus.

The method according to the invention may comprise various reactions, which can be defined by the reaction equations as shown below,

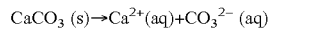
$CaCO_3\ (s) \rightarrow Ca^{2+}(aq) + CO_3^{2-}\ (aq)$

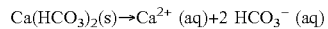
$Ca(HCO_3)_2(s) \rightarrow Ca^{2+}\ (aq) + 2\ HCO_3^-\ (aq)$

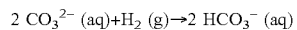
$2\ CO_3^{2-}\ (aq) + H_2\ (g) \rightarrow 2\ HCO_3^-\ (aq)$

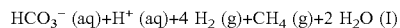
$HCO_3^-\ (aq) + H^+\ (aq) + 4\ H_2\ (g) + CH_4\ (g) + 2\ H_2O\ (l)$

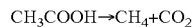
$CH_3COOH \rightarrow CH_4 + CO_2$

$x\ Ca^{2+}\ (aq) + y\ PO_4^{3-} \rightarrow Ca_x(PO_4)_y$ $CaCO_3$ is calcium carbonate, $HCO_3$ is hydrogencarbonate, $CO_3^{2-}$ is carbonate, $Ca^{2+}$ is calcium cation, $H^+$ is hydron, $H_2$ is hydrogen, $CH_4$ is methane, and $H_2O$ is water. The abbreviation "aq" stands for aqueous, "g" stand for gas, and "l" stands for liquid.

The method according to the invention for phosphate recovery from a waste stream starts with providing a tank reactor, and providing acidogenic bacteria and/or acetogenic bacteria and the waste stream to the tank. The bacteria and waste stream can be supplied together to the tank reactor. Alternatively, the acidogenic bacteria and/or acetogenic bacteria may be provided to the tank reactor first, before the waste stream is provided to the tank reactor.

The method is followed by the step of hydrolysing the waste stream, and forming the reaction mixture. Treating the waste stream by hydrolysis has the advantage that the solids are degraded faster such that fewer solids are present in the effluent/reaction mixture. Experiments showed that fewer solids in the reaction mixture are preferred for following steps of the method according to the invention.

In a preferred embodiment, the tank reactor is a continuously stirred tank reactor or an interval stirred tank reactor. Stirring the waste stream within tank reactor has the advantage that the mixing of the waste stream is improved and that the acidogenic bacteria and/or acetogenic bacteria are efficiently exposed to the waste stream. This results in an effective and efficient hydrolysis.

Preferably, the tank reactor comprises an acidic environment. As a result the acidogenic bacteria and/or acetogenic bacteria outcompete methanogenic organisms, and effective production of organic acids is achieved. The acidic environment may be obtained by providing high organic loading rates to the tank reactor. The acidic pH increases the solubility of solid phosphor and/or compounds comprising phosphate, wherein the phosphor and/or compounds comprising phosphate in solution are orthophosphate. The elevated concentration of organic acids and orthophosphate may benefit the anaerobic digestion and crystallisation of the compound comprising phosphate in the anaerobic sludge reactor.

Furthermore, the effective production of organic acids enables a stable acidic environment.

In a preferred embodiment the tank reactor is tank reactor is provided with anaerobic thermophilic microbes.

Providing the tank reactor with anaerobic thermophilic microbes enables to degrade (more) organic matter efficiently and effectively. This degradation is performed due to temperature induced hydrolytic effects and preferred kinetics compared to mesophilic operating microbes.

Furthermore, the accumulation of volatile fatty acids prevents an increase of the pH. As a result, an efficient and effective solubility of solid phosphor and/or compounds comprising phosphate is achieved.

After the hydrolysing step, the step of providing a gas flow to the reaction mixture for removing carbon dioxide ($CO_2$) from the reaction mixture is performed. Removing the carbon dioxide from the reaction mixture, which is formed during the step of hydrolysing the waste stream, results in an efficient and effective phosphate salt crystallisation.

At acidic pH, the alkalinity based on inorganic carbon may become aqueous $CO_2$. To strip the aqueous $CO_2$ a gas flow is provided to the reaction mixture in the tank reactor. The provided gas flow may be a carrier gas, for example methane, nitrogen, ethane, and the like. Stripping the $CO_2$ from the reaction mixture decreases the acidity level, in other words the reaction mixture becomes more basic. Furthermore, this prevents an oversaturation of hydrogencoarbonate and/or carbonate anions. It is noted that the provided gas flow initially lacks $CO_2$. In other words, the gas flow provided to the reaction mixture for removing carbon dioxide from the reaction mixture does not comprises $CO_2$.

A further advantage of removing $CO_2$ from the reaction mixture is that a faster release of $HCO_3$ is achieved. As a result, the pH may decrease faster in the acidic environment compared to a method without the step of providing a gas flow to the reaction mixture for removing carbon dioxide from the reaction mixture.

In addition, the faster release of $HCO_3^-$ in the tank reactor enables an increase of the reduction of $HCO_3^-$ in the tank reactor. Therefore, the amount of calcium ions ($Ca^{2+}$) is optimised for use in the anaerobic sludge reactor for forming $Ca_x(PO_4)_y$, instead of forming $CaCO_3$.

Furthermore, it was found that removing the $CO_2$ is most efficient using (carrier) gas. In fact, said gas may replace a (overhead) stirrer. Therefore, said (carrier) gas reduces the amount of mechanical parts and thus the amount of maintenance.

For example, the use of hydrogen gas ($H_2$) as (carrier) gas allows converting $CO_2$ in methane ($CH_4$) and improves mixing of the reaction mixture in the tank reactor and/or anaerobic sludge reactor. It was also found that the conversion of $CO_2$ with $H_2$ into $CH_4$ helps to lift the pH locally and consequently induces the formation of $Ca_x(PO_4)_y$ in the anaerobic sludge reactor (hydrogenotrophic methanogenesis).

As such, the hydrogenotrophic methanogens may increase the pH locally, among other influences, for example acids, which induce precipitation of $Ca_x(PO_4)_y$. It is noted that a variety of different thermodynamic phases is present in the anaerobic sludge reactor.

In a preferred embodiment, part of the formed $CH_4$ gas may be recycled through the tank reactor and/or anaerobic sludge reactor to enhance the stripping of $CO_2$ from the reaction mixture.

It was found that $CH_4$ is hardly soluble in the reaction mixture. Furthermore, when $CH_4$ is removed from the reaction mixture, for example removed from the anaerobic sludge reactor, said gas may be used as green gas/for combustion.

The reaction mixture may be provided to a further reactor by the step of providing/supplying the reaction mixture to an anaerobic sludge reactor. Providing the reaction mixture to the anaerobic sludge reactor is preferably at a rate which keeps the pH in the anaerobic sludge reactor about neutral. A neutral pH in the anaerobic sludge reactor has the advantage that biogas may be formed from the conversion of the volatile fatty acids, wherein the biogas is for example methane.

A further advantage of providing the waste stream to the anaerobic sludge reactor is that biological hazardous materials, such as pathogens, are inactivated, and pharmaceutical compounds and disinfection compounds are removed. The result is that an even further purified waste stream is obtained. The inactivation and remove may be performed at a temperature in the range of 40° C. to 70° C., preferably at a temperature in the range of 50° C. to 60° C., more preferably at a temperature of 55° C., for a time in the range of 12 hours to 36 hour, preferably for a time in the range of 18 hours to 30 hours, more preferably for a time of 24 hours.

In a preferred embodiment, the anaerobic sludge reactor is an upflow anaerobic sludge blanket reactor, wherein the flow of the gas is upward.

After the step of providing the reaction mixture to an anaerobic sludge reactor, the step of removing a compound comprising phosphate from the reaction mixture within the anaerobic sludge reactor is performed. Removing the compound comprising phosphate from the reaction mixture has the advantage that phosphate, a valuable resource, is recovered. As a further advantage, the compound comprising phosphate preferably comprises an amorphous crystallinity. Experiments with the method according to the invention show a high percentage of amorphous crystallinity, preferably above 90 wt %. As a result the compound comprising phosphate shows a better uptake by crops, for example.

A further advantage of the method according to the invention is the promotion of crystallization and crystal growth due to the extraction/removal of phosphorus from the reactor. This advantage is even further increased by the valorisation of the recovered product by increasing the phosphorus content.

The anaerobic sludge reactor further preferably comprises a gas lift. The gas lift results in a particle distribution, wherein the heaviest particles precipitate, such as the compounds comprising phosphate, and the gas molecules move upwards.

An advantage of the gas lift is that the crystal growth and fractionation of the solids in the anaerobic sludge reactor is promoted, preferably this is promoted by density. Furthermore, the gas lift enables gravitational separation based on density induced solid retention. For example, solids build a blanket inside the anaerobic sludge reactor which serves as a filter to retain lighter solids longer than liquid. As such, the whole anaerobic sludge reactor is a biologically active, solid retention unit, by itself.

As a result the anaerobic sludge reactor may retain particles longer than aqueous species due to the vertical flow and the counter directed gravity. Therefore, phosphorus may solidify in the anaerobic sludge reactor and settle to the bottom of said reactor.

The removed compound comprising phosphate may be a phosphate salt, wherein the counter-ion is preferably calcium, potassium and/or sodium.

The gas, for example the biogas, which is accumulating in the anaerobic sludge reactor may be removed in the step of removing gas from the reaction mixture within the anaerobic sludge reactor. An advantage of removing the gas, such as the biogas is that the biogas may be used as fuel. Therefore, the method according to the invention provides green gas which may be used for example as green fuel for cars and/or energy power plants.

It will be understood that removing the gas from the reaction mixture may also involve separating the gas from the reaction mixture.

In a preferred embodiment, the tank reactor and/or anaerobic sludge reactor are heated by a heating step. Preferably, the heat is (partly) obtained by the combustion of the gas accumulated in the anaerobic sludge reactor.

The method according to the invention comprises the combination of a pH self sustaining hydrolysis step in the tank reactor and biologically induced crystallisation within an anaerobic sludge reactor for biologically induced crystallisation during the treatment of the waste stream. The configuration of the method, wherein the provided tank reactor and the provided anaerobic sludge reactor are preferably configured in series, results in stimulation of the crystallisation of the compound comprising phosphate.

Experiments show that the treatment of the waste stream/reaction mixture within the tank reactor can be performed within 10 days, preferably within 5 days. Furthermore, the treatment of the reaction mixture within the anaerobic sludge reactor can be performed within 50 days, preferably within 25 days.

In a preferred embodiment, the method according to the invention does not involve the use of membranes. In fact, membranes are not required in the tank reactor and/or anaerobic sludge reactor. A pre-screening to retain organic matter outside the digestion process and concentrate phosphorus in the reactors improves the method according to the invention. Therefore, the method according to the invention may further comprise the steps of pre-screening the waste stream and/or separating undesired particles from the waste stream.

When the tank reactor is operated as a continuously stirred tank reactor, the concentration of all components in the reactor is substantially the same as in its effluent. The anaerobic sludge reactor is configured to retain particles longer than the aqueous species. This is achieved by the vertical flow and the (counter directed) gravity. As a result, the phosphorus forms a solid composition in the anaerobic sludge reactor and may settle to the bottom of said reactor.

Therefore, membranes are not necessary to perform the method according to the invention. As such, an electrochemical system may be included after the anaerobic sludge reactor to be able to recover ammonium from the aqueous stream which is removed from the anaerobic sludge reactor. For example, such system may include a series of ion-exchange membranes wherein the driving force is induced by electrodes outside and/or inside the cell.

In fact, membranes are generally avoided in the system used to perform the method according to the invention. Preferably, membranes are avoided until the effluent is removed from the anaerobic sludge reactor. Membranes are avoided because these are prone for clogging and maintenance is increased.

In a preferred embodiment according to the invention, the waste stream of the method is an animal manure waste stream.

A waste stream which comprises phosphate is animal manure. An advantage of recovering phosphate from the animal manure waste stream is that the valuable recourses therein are recovered. The recovered resources may be used as fertilizer for farmland. The recovery of the phosphate enables the reduction of the loss of valuable resources and enables the ability to use the recovered phosphate in a controlled manner as fertilizer for farmland as the elemental composition of the animal manure may not match with crop demand.

Furthermore, such recovery reduces a surplus of phosphate at areas with little to no agricultural land to discharge animal manure. This results in less transport of animal manure and therefore a reduction of the pollution of compounds which are harmful for the environment, such as carbon monoxide and carbon dioxide.

A further advantage of recovering the phosphate from the animal waste stream is that less eutrophication in effluent receiving surfaces waters, therefore, the impact on the environment is reduced.

In a preferred embodiment according to the invention, the method further comprises the step of adding a compound comprising calcium prior to and/or in the step of hydrolysing the waste stream.

Adding a compound comprising calcium prior to and/or in the step of hydrolysing the waste stream has the advantage that phosphate may be captured by the calcium and forms solid particles and/or dissolution of the calcium comprising compound is achieved.

It will be understood that a compound comprising sodium, magnesium, or potassium may also be used. Such compound has the same effect and advantages as the compound comprising calcium.

Another advantage of the method according to the invention is that adding the compound comprising calcium prior to and/or in the step of hydrolysing the waste stream enables the addition of a calcium salt which is soluble at an acidic pH. Examples of such compound comprising calcium are calcium carbonate, calcium bicarbonate, potassium carbonate, potassium bicarbonate, sodium carbonate, and sodium bicarbonate, magnesium carbonate, and magnesium bicarbonate. The carbonate anion may react with hydrogen to form methane and water. As a result, a surplus of $Ca^{2+}$ is achieved, which may react/bind with phosphate anions. Preferably, the reacting/binding is performed within the anaerobic sludge reactor.

Adding a compound comprising calcium prior to and/or in the step of hydrolysing the waste stream, wherein the pH is acidic, prevents the addition halogenated calcium slats, for example calcium chloride. As a result, the reaction mixture is prevented to become salty.

Furthermore, the calcium ions may form biofilms or granules when the pH is increased, for example in the anaerobic sludge reactor, due to bridging between extra cellular polymeric substances. Preferably, calcium phosphate is formed due to an increase of the pH, created in a micro-environment between the reaction mixture in the anaerobic sludge reactor and the granules.

In a preferred embodiment, the compound comprising calcium that is added prior to and/or in the step of hydrolysing the waste stream is calcium carbonate. Calcium carbonate is a waste product during water polishing. Using calcium carbonate reduces the waste stream of water treatment plants.

A further advantage is that calcium carbonate is cheaper compared to calcium chloride. The costs of the method according to the invention therefore obviate or at least reduce the costs of conventional methods.

Similar advantages are applicable for calcium bicarbonate, potassium carbonate, potassium bicarbonate, sodium carbonate, and sodium bicarbonate, magnesium carbonate, and magnesium bicarbonate.

In a preferred embodiment according to the invention, the method further comprises the step of adding a compound comprising calcium during and/or after the step of providing the reaction mixture to the anaerobic sludge reactor.

Adding a compound comprising calcium during and/or after the step of providing the reaction mixture to the anaerobic sludge reactor has the advantage that a compound comprising phosphate may precipitate. Such precipitation is desired to recover the valuable phosphate.

Another advantage of adding a compound comprising calcium during and/or after the step of providing the reaction mixture to the anaerobic sludge reactor is that the compound comprising calcium may be added to the reaction in a dosing regime. Such dosing regime results in a controlled precipitation of the desired compound comprising phosphate, such as calcium phosphate.

Adding a compound comprising calcium during and/or after the step of providing the reaction mixture to the anaerobic sludge reactor, includes preferably a compound comprising calcium which is soluble at a pH of at least 6. For example, calcium chloride is soluble at such pH and experiments have shown that calcium chloride provided effective and efficient precipitation of calcium phosphate is achieved.

A controlled dosing regime may be provided by pneumatic valves, for example. Pneumatic valves may optimize pressure distribution and liquid separation of a concentrated calcium chloride solution. Such valves prevent clogging of the anaerobic sludge reactor and reduce the hold time between the different method steps and thus the downtime of the system.

In a preferred embodiment according to the invention, the method comprises the step of adding a compound comprising calcium prior to and/or in the step of hydrolysing the waste stream and the step of adding a compound comprising calcium during and/or after the step of providing the reaction mixture to the anaerobic sludge reactor. Experiments showed that such combination of steps provided efficient and effective precipitation of the compound comprising phosphate, for example calcium phosphate.

In a preferred embodiment according to the invention, the method further comprises the step of separating the waste stream into a thick fraction and a thin fraction prior to the providing the waste stream to the tank reactor step, wherein the thin fraction is provided to the tank reactor. Preferably, the step of separating comprises sieving the waste stream, wherein the sieving is preferably performed using a drum sieve.

The thin fraction comprises at least 80% of the nutrients of the starting fraction, preferably at least 85% of the nutrients of the starting, and most preferably at least 90% of the nutrients of the starting fraction. Such thin fraction is beneficial as it comprises at most 20% of the solid content of the starting fraction, preferably at most 15% of the solid content of the starting fraction, and most preferably at most 10% of the solid content of the starting fraction.

Preferably, the thick fraction is used as bedding, soil enrichment, or fertilizer. The advantage of such thick fraction is that it comprises at least 80% organic material of the starting fraction, preferably at least 85% organic material of the starting fraction, and most preferably at least 90% organic material of the starting fraction.

Experiments showed that a thin fraction provided efficient and effective phosphate recovery.

An advantage of the method according to the invention is that the starting fraction is entirely recycled. Therefore, the method according to the invention reduces the environmental impact and controlling nutrient levels in soil, farmland, and the like is achieved.

Preferably, the step of separating comprises sieving the waste stream, wherein the sieving is preferably performed using a drum sieve. It was shown that an efficient separation of the thick and thin fraction was achieved.

In a preferred embodiment according to the invention, the method further comprises the step of providing a gas flow to the anaerobic sludge reactor prior to and/or in the step of removing a compound comprising phosphate from the reaction mixture within the anaerobic sludge reactor, wherein the gas flow provided to the anaerobic sludge reactor comprises gas from the step of providing a gas flow to the reaction mixture for removing carbon dioxide from the reaction mixture. Preferably, the method further comprises the step of adding hydrogen gas to the anaerobic sludge reactor prior to and/or in the step of removing the compound comprising phosphate from the reaction mixture within the anaerobic sludge reactor.

Providing a gas flow to the anaerobic sludge reactor prior to and/or in the step of removing a compound comprising phosphate from the reaction mixture within the anaerobic sludge reactor enables the formation, wherein the gas flow provided to the anaerobic sludge reactor comprises gas from the step of providing a gas flow to the reaction mixture for removing carbon dioxide from the reaction mixture, enables the formation of methane in the anaerobic sludge reactor.

Another advantage is that the $CO_2$ produced in the tank reactor can be reacted to gasses such as methane. This results in a method with little pollution of environmental hazardous gasses such as $CO_2$. The methane can be used as fuel to produce energy.

To increase the conversion of $CO_2$ into methane is preferred to add hydrogen gas to the gas flow and/or anaerobic sludge reactor. In a preferred embodiment a conversion of at least 80% of the $CO_2$ to methane is achieved, preferably at least 90% of the $CO_2$ to methane is achieved, and most preferably substantially full conversion to methane is achieved.

A further advantage of the conversion of $CO_2$ to methane is that $CO_2$ may be captured/trapped in a controllable manner. When the methane is combusted a controlled release of $CO_2$ is achieved. As a result, it is possible to capture/trap this $CO_2$.

In a preferred embodiment according to the invention, the step of providing a gas flow to the anaerobic sludge reactor prior to and/or in the step of removing a compound comprising phosphate from the reaction mixture within the anaerobic sludge reactor enables the formation, comprises the step of providing a 50% $CO_2$/50% $CH_4$ gas flow.

In a preferred embodiment according to the invention, the gas flow provided to the tank reactor of the method comprises gas from the step of removing gas from the reaction mixture within the anaerobic sludge reactor.

Providing gas to the tank reactor wherein the gas is from the step of removing gas from the reaction mixture within the anaerobic sludge reactor enables a circular method and system. An advantage of the method according to the invention is that the use of additional gas in the tank reactor is reduced or prevented.

The methane or gas mixture comprising methane removed from the anaerobic sludge reactor may be used as carrier gas. Experiments showed that methane or a gas mixture comprising methane reduced the amount of solubilised $CO_2$ in the tank reactor efficiently and effectively.

In a preferred embodiment according to the invention, the reaction mixture of the method within the tank reactor has a pH in the range of 4 to 7, preferably a pH in the range of 4 to 6, and most preferably a pH in the range of 5 to 6, and wherein the reaction mixture of the method within anaerobic sludge reactor comprises a pH of at least 6, preferably a pH of at least 7, and most preferably a pH of at least 7.5.

Providing a pH in the tank reactor in the range of 4 to 7, preferably a pH in the range of 4 to 6, and most preferably a pH in the range of 5 to 6 has the advantage that the compound comprising calcium such as calcium carbonate, calcium bicarbonate, potassium carbonate, potassium bicarbonate, sodium carbonate, and sodium bicarbonate, magnesium carbonate, magnesium bicarbonate and the like are soluble. This enables the use of environmental friendly calcium sources for the precipitation of phosphate.

Providing a pH of within the anaerobic sludge reactor of at least 6, preferably a pH of at least 7, and most preferably a pH of at least 7.5 enable the precipitation of calcium phosphate in the anaerobic sludge reactor. Recovery of the phosphate is achieved.

An important aspect to the pH change between the tank reactor and the anaerobic sludge reactor is controlling the addition of the acidic solution from the tank reactor to the anaerobic sludge reactor. The pH in the in the anaerobic tank reactor is preferably constant with a deviation of plus or minus 0.5 of the pH. This prevents precipitation of calcium.

In a preferred embodiment according to the invention, the waste stream provides the solid, dissolved and/or liquid compounds to the tank reactor and that the pH is between 4 and 7, preferably the pH is between 5 and 6. Preferably, the waste stream is animal manure.

In other words, the waste stream provides all the desired chemicals to recover valuable elements such as compounds comprising phosphorus, compounds comprising nitrogen, and the like.

It was found that at a pH between 4 and 7, preferably between 5 and 6 the calcium in manure is released. The desired calcium is released from the solid phase, for example $CaCO_3$ and/or small $Ca_x(PO_4)_y$, crystals which may be present in the manure. Therefore, no additional compounds need to be added to the reaction mixture.

Optionally, a compound comprising calcium may be added to the reaction mixture in the tank reactor. This enables to recover valuable compounds, such as phosphor comprising compounds, when a waste stream comprises a low concentration of calcium.

In a preferred embodiment, the effluent of the tank reactor is provided to a buffer tank. An advantage of said buffer tank is that the effluent may be conditioned before it is provided to the anaerobic sludge reactor. For example, the pH of the effluent may be adjusted to the desired pH.

In a preferred embodiment according to the invention, the method further comprises the step of heating the waste stream prior to the step of hydrolysing waste stream, wherein the waste stream is heated to at least 45° C., preferably to at least 50° C., and more preferably to at least 55° C.

Experiments showed that heating the waste stream to at least 45° C., preferably to at least 50° C., and more preferably to at least 55° C. results in an efficient and effective hydrolysis, wherein the hydrolysis rate is improved by at least 40% compared to 20° C. (room temperature).

In a preferred embodiment according to the invention, the step of the method of providing the waste stream to a tank reactor is performed at an organic loading rate in the range of 2 to 7 kg COD/m³·d, preferably at an organic loading rate in the range of 3 to 6 kg COD/m³·d.

The organic loading rate may be expressed by the following equation:

$$kg\ COD/m^3 \cdot d$$

wherein kg is kilogram, COD carbon oxygen demand, m³ is the reactor volume in cubic metre, and d is the time in days.

Providing the waste stream to the tank reactor at an organic loading rate in the range of 2 to 7 kg COD/m³·d showed an efficient and effective recovery of the phosphate. Even better results were achieved at an organic loading rate in the range of 3 to 6 kg COD/m³·d. At this organic loading rate the compound comprising phosphate can form and precipitate.

Preferably the compound comprising phosphate forms and precipitates within the anaerobic sludge reactor.

In a preferred embodiment according to the invention, the method further comprises the step of removing a compound comprising nitrogen and/or the step of removing a compound comprising sulphur during and/or after the step of removing gas from the reaction mixture within the anaerobic sludge reactor.

The step of removing a compound comprising nitrogen and/or the step of removing a compound comprising sulphur during and/or after the step of removing gas from the reaction mixture within the anaerobic sludge reactor enables to recover other valuable resources such as nitrogen and sulphur. Preferably, the removal of the compound is done after removal of the gas from the anaerobic sludge reactor.

A further advantage is that the method according to the invention is that the waste stream is even further decomposed, as a result more fertilizer is achieved which is poor in nitrogen and sulphur.

In a preferred embodiment according to the invention, the acidogenic bacteria and/or acetogenic bacteria is one or more selected from the group of: Thermoplasmatales, MBA03 of the class Clostridia, Hydrogenispora sp., Halocella sp., Fermentimonas sp., Proteiniphilum sp., Candidatus Methanoplasma sp., Methanoculleus ssp., Methanobrevibacter ssp., Sphaerochaeta ssp.. Preferably, the acidogenic bacteria and/or acetogenic bacteria is one or more selected from the group of Hydrogenispora sp., Halocella sp., Fermentimonas sp., Proteiniphilum sp., Candidatus Methanoplasma sp., Methanoculleus ssp., Methanobrevibacter ssp., Sphaerochaeta ssp..

Preferably, the acidogenic bacteria and/or acetogenic bacteria is one or more selected from the group of Thermoanaerobacterium thermosaccharolytium, Thermoanaerobacterium butyriciformans.

It was found that these bacteria provided efficient and effective recovery of the desired phosphorus comprising compound.

It is noted that Hydrogenispora sp., Halocella sp., Fermentimonas sp., Proteiniphilum sp. may be used in the tank reactor and that Candidatus Methanoplasma sp., Methanoculleus ssp., Methanobrevibacter ssp., Sphaerochaeta ssp. may be used in the anaerobic sludge reactor.

The bacteria in the tank reactor may catalyse oxidation of the compounds comprising carbon. Furthermore, Candidatus Methanoplasma sp., Methanoculleus ssp., Methanobrevibacter ssp., Sphaerochaeta ssp. are methanogenic archaea and are desired to perform the methanogenic reactions.

In the tank reactor an acidification process is performed. It was found that the acidification process/amount of acid could be steered into the desired direction by varying the loading (providing of the waste stream) to the tank reactor. This may than increase the organic matter content and therefore more organic acids may be produced. For example, the use of starch may increase the production of volatile fatty acids (VFA).

The step of removing a compound comprising nitrogen and/or the step of removing a compound comprising sulphur may be a post treatment step.

The invention also relates to a system for phosphate recovering from a waste stream, such as an animal manure waste stream, the system being capable of performing the method in one or more of the embodiments according to the invention, wherein the system comprises:
  a tank reactor for performing hydrolysis with acidogenic bacteria and/or acetogenic bacteria comprising:
    a gas inlet;

a gas outlet;
a waste stream inlet; and
a reaction mixture outlet; and
an anaerobic sludge reactor, comprising:
a reaction mixture inlet, which is operatively coupled to the reaction mixture outlet of the tank reactor;
a gas inlet;
a particle outlet;
a gas outlet; and
a liquid outlet.

The system provides the same effects and advantages as those described for the method.

A further advantage of the system according to the invention is that the system may be adapted to specific needs of the customer.

Furthermore, the system according to the invention may operate batchwise or continuously. This results in an efficient and effective waste stream management. Therefore, the tank reactor may be a continuously stirred tank reactor. Preferably, the system according to the invention prevents the accumulation of the waste stream before it is treated.

The system according to the invention comprises an anaerobic sludge reactor with a volume of 300 m$^3$. Such anaerobic sludge reactor suits the treatment of 200 to 250 cows.

In a preferred embodiment, the system according to the invention comprises a buffer tank. The buffer tank is arranged between the tank reactor and the anaerobic sludge reactor. Furthermore, the buffer tank is operatively coupled with the tank reactor and the anaerobic sludge reactor.

In a preferred embodiment according to the invention the system further comprises a sieve, wherein the sieve is preferably a drum sieve. The sieve is provided to the system before the tank reactor and has the advantage that solids and liquid may be separated before hydrolysis is performed.

In a preferred embodiment according to the invention, the gas outlet of the anaerobic sludge reactor of the system is operatively coupled to the gas inlet of the tank reactor. Preferably, the anaerobic sludge reactor may be an up-flow anaerobic sludge bed reactor.

Operatively coupling the gas outlet of the anaerobic sludge tank reactor and the gas inlet of the tank reactor enables circulation of the gas within the system. As a result the system according to the invention is a circular system, providing in the long felt need of environmental friendly recovery of valuable resources, such as compounds comprising phosphate.

In a preferred embodiment according to the invention, the system further comprises a screw press which is operatively coupled with the waste stream inlet of the tank reactor, and is configured to separate the waste stream into a thick fraction and a thin fraction, wherein the thin fraction is provided to the tank reactor.

Separating the waste stream in a thin fraction and a thick fraction prevents the system from clogging. Therefore, the down time of the system is reduced and an economical efficient system is achieved.

In a preferred embodiment according to the invention, the anaerobic sludge reactor of the system further comprises at least one pneumatic valve which is configured to add a compound comprising calcium in a controlled manner.

The pneumatic valve of the system according to the invention enables a dosing regime of the compound comprising calcium. This prevents an addition of the compound comprising calcium which is too quick resulting in clogging a formation of undesired particles due to local increase of the pH.

Furthermore, the pneumatic valves may be operatively connected with the tank reactor and/or anaerobic sludge reactor.

In a preferred embodiment according to the invention, the system further comprises heating means, wherein the heating means are operatively coupled to the tank reactor to heat the waste stream.

The heating means of the system according to the invention may accelerate the hydrolysis of the waste stream. As a result, the retention time of the waste stream within the system according to the invention is reduced and the throughput may be increased.

Preferably, the heating means are (partly) provided with the heat obtained from the combustion of the methane gas recovered from the anaerobic sludge reactor.

In a further preferred embodiment, the system is provided with an energy generator which is configured to produce electricity and/or heat from the combustion of gas, preferably methane gas.

An advantage of such system is that the energy need from an external source is reduced, and therefore the operating costs are reduced.

In a preferred embodiment according to the invention, the system further comprises a nitrogen removal reactor for removing a compound comprising nitrogen and/or the system further comprises a sulphur removal reactor for removing a compound comprising sulphur, wherein the sulphur removal reactor is aerated.

An advantage of the system according to the invention is that further valuable resources such as nitrogen and sulphur may be recovered. The recovered resources may be used as fertiliser and the demand of nutrients may be controlled. Particularly farmlands may benefit from such system.

The nitrogen removal reactor of the system may for example be a post treatment system, wherein the nitrogen may be recovered via transmembrane chemisorption coupled with an electrochemical system.

Another advantage of providing a nitrogen removal reactor is that nitrogen may be recovered as ammonia ($NH_3$) and that the removal of ammonia may be achieved without aeration. The removal of ammonia produces hydrogen gas which may be fed to the anaerobic sludge reactor to convert carbon dioxide to methane.

Furthermore, providing the sulphur removal reactor may result in removal of hydrogen sulphide. The removal of hydrogen sulphide may be achieved by an aeration step to oxidise the sulphur.

In a preferred embodiment according to the invention, the system further comprises a manure pit, wherein the manure pit is operatively coupled to the tank reactor.

An advantage of the system according to the invention is that the manure pit may be emptied frequently and the amount of manure within the pit may be kept to a minimum. This has the advantage that the formation and release within the environment of hazardous compounds is reduced. The hazardous compounds, such as ammonia, hydrogen sulphide, carbon dioxide, hydrogen cyanide, and methane, are the result of exposing manure to air and/or the mixing of urine with faeces.

The system may be used for phosphate recovering from a waste stream, wherein the waste stream comprises the waste stream from a stable, animal waste stream, an industrial waste water stream, a (concentrated toilet water waste stream, and the like.

An advantage of such use is that the waste stream valuable phosphate is recovered from the waste stream. Furthermore, eutrophication of a body of water is prevented. As a result, normal growth of algae in the (local) environment is achieved.

The invention also relates to a stable for phosphate recovering from a waste stream, such as an animal manure waste stream. the stable being capable of performing the method in one or more of the embodiments according to the invention, wherein the comprises stable comprises the system according to an embodiment of the invention.

The stable provides the same effects and advantages as those described for the method and/or the system.

Another advantage of the stable according to the invention is that manure can be recycled on site and the recovered resources may be used as fertiliser for farmlands. As a result the long felt need for a circular farm is achieved.

Providing a stable according to the invention reduces transport of manure and thus the reduction of greenhouse gasses. If needed, the valuable resources may be transported as pellets, wherein the pellets are formed by compounds comprising phosphate, compounds comprising nitrogen, or compounds comprising phosphate.

Further advantages, features and details of the invention are elucidated on the basis of preferred embodiments thereof, wherein reference is made to the accompanying figures, in which.

Figure 1:
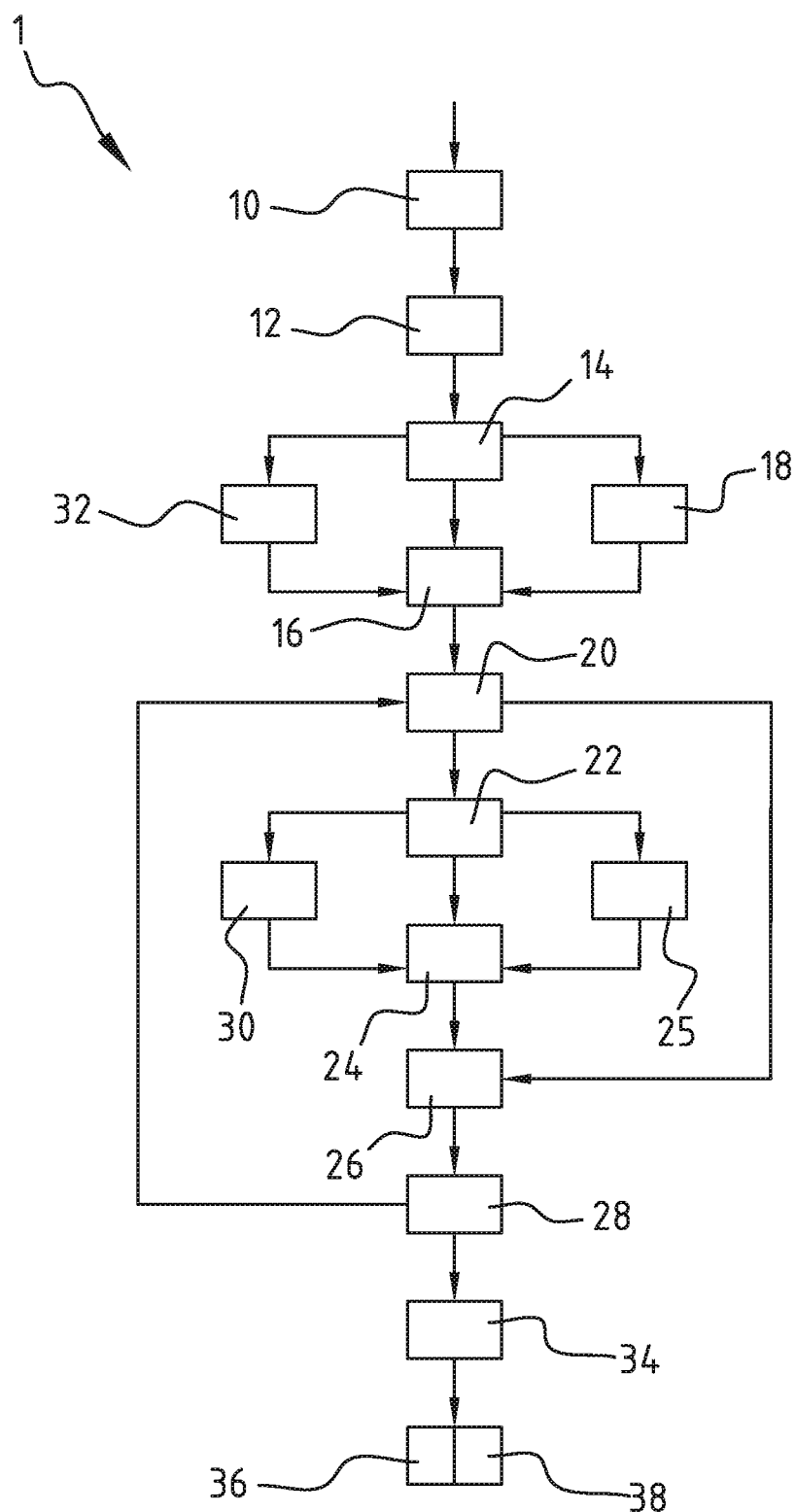
FIG. 1 shows a schematic overview of the method according to the present invention.

Method 2 (FIG. 1) for phosphate recovering from a waste stream follows a sequence of different steps.

In the illustrated embodiment method 2 may start with step 10 of separating the waste stream into a thick fraction and a thin fraction prior to the providing the waste stream to the tank reactor step.

Step 12 of providing a tank reactor is followed by step 14 of providing acidogenic bacteria and/or acetogenic bacteria and the waste stream to the tank reactor, wherein the thin fraction of step 10 is used as waste stream. The waste stream is treated in step 16 of hydrolysing the waste stream, and forming the reaction mixture.

In an alternative embodiment according to the invention, step 18 of adding a compound comprising calcium prior to and/or in the step of hydrolysing the waste stream is performed before step 16.

In another alternative embodiment according to the invention or in addition to the previous embodiment, the step of heating the waste stream prior to the step of hydrolysing waste stream, wherein the waste stream is heated to at least 45° C., preferably to at least 50° C., and more preferably to at least 55° C. 32 is performed before step 16.

Step 16 is performed together with or followed by step 20 of providing a gas flow to the reaction mixture for removing carbon dioxide from the reaction mixture.

In an alternative embodiment the gas is the removed gas from the reaction mixture within the anaerobic sludge reactor.

Step 20 is then followed by step 22 of providing the reaction mixture to an anaerobic sludge reactor. From the anaerobic sludge reactor the compound comprising phosphate may be removed in step 24 of removing a compound comprising phosphate from the reaction mixture within the anaerobic sludge reactor.

In an alternative embodiment the step of adding a compound comprising calcium after the step of providing the reaction mixture to the anaerobic sludge reactor 25 may be performed before step 24.

In another alternative embodiment according to the invention or in addition to any one of the previous embodiments hydrogen gas is added to the anaerobic sludge reactor by step 30 of adding hydrogen gas to the anaerobic sludge reactor.

Step 24 is followed by step 26 of providing a gas flow to the anaerobic sludge reactor.

Preferably, the gas flow provided to the anaerobic sludge reactor comprises gas from step 20. From the anaerobic sludge reactor gas is removed by step 28 removing gas from the reaction mixture within the anaerobic sludge reactor. The removed gas may be used in step 20.

Preferably the reaction mixture is then provided to the nitrogen removal reactor and/or sulphur removal reactor by step 34 of providing the reaction mixture to the nitrogen removal reactor and/or sulphur removal reactor. The recovery/removal of the compound comprising nitrogen and/or compound comprising sulphur is performed by step 36 of removing a compound comprising nitrogen and/or step 38 of removing a compound comprising sulphur after the step of removing gas from the reaction mixture within the anaerobic sludge reactor.

System 50 (FIG. 2) comprises tank reactor 52 for performing hydrolysis with acidogenic bacteria and/or acetogenic bacteria. Tank reactor 52 comprises gas inlet 54, gas outlet 56, waste stream inlet 58, and reaction mixture outlet 60. Waste stream inlet 58 and reaction mixture outlet 60 preferably comprise a valve (not shown) to control the input and output of tank reactor 52. Tank reactor 52 further comprises stirring means 62 enabling to continuously stir reaction mixture 64.

System 50 further comprises anaerobic sludge reactor 66. Anaerobic sludge reactor 66 comprises reaction mixture inlet 68, gas inlet 70, particle outlet 72, gas outlet 74, and liquid outlet 76. Anaerobic sludge reactor 66 enables formation of particles 88.

Reaction mixture inlet 68 is operatively coupled to reaction mixture outlet 60 via pipe 75. Pipe 75 comprises valve 80, wherein valve 80 controls the mixing of the reaction mixture with stream 82. Stream 82 may comprise additional waste stream, additives, solvent, and the like.

In an alternative embodiment gas inlet 54 and gas outlet 74 are operatively connected via pipe 86. In another alternative embodiment gas inlet 70 and gas outlet 56 are operatively coupled via pipe 84.

Pipe 84 comprises valve 85 to control the gas flow from tank reactor 52 and may provide additional gas to anaerobic sludge reactor 66.

Pipe 86 comprises valve 100 to control the gas stream from anaerobic sludge reactor 66.

In order to control the addition of a compound comprising calcium to tank reactor 52 and/or anaerobic sludge reactor 66, tank reactor 52 and/or anaerobic sludge reactor 66 may comprise pneumatic valve 90 and/or pneumatic valve 92 respectively. Pneumatic valve 90 is operatively connected to tank 91 and pneumatic valve 92 is operatively connected to tank 93.

Furthermore, tank reactor 52 and/or anaerobic sludge reactor 66 may comprise heating means 94 and/or heating means 96 respectively. The heating means may heat the waste stream and/or reaction mixture in order to increase the reactions within tank reactor 52 and/or anaerobic sludge reactor 66.

System 50 further comprises screw press 98 which is operatively coupled with waste stream inlet 58 and nitrogen removal tank 102. Screw press 98 is configured to separate the waste stream in a thick fraction and thin fraction, and wherein the thin fraction is provided to tank reactor 52.

Liquid outlet 76 is operatively to nitrogen removal reactor 102 via pipe 104 and 106. Pipe 104 provides the reaction mixture to nitrogen removal reactor 102 and pipe 106 may provide gasses via inlet 108 to anaerobic sludge reactor 66. Such gasses may be for example hydrogen.

System 50 further comprises sulphur removal tank 110 which is operatively coupled with nitrogen removal tank 102 via pipe 112. Sulphur removal tank 110 is aerated and further comprises outlet 114.

System 50 further comprises manure pit 116 which is operatively coupled to screw press 98 to provide a waste stream to tank reactor 52. Such waste stream may be animal manure.

In an alternative embodiment nitrogen removal tank 102 and sulphur removal tank 110 are swapped.

Optionally, a buffer tank may be arranged between tank reactor 52 and anaerobic sludge reactor 66, wherein said buffer tank is operatively coupled with tank reactor 52 and anaerobic sludge reactor 66.

Figure 3:
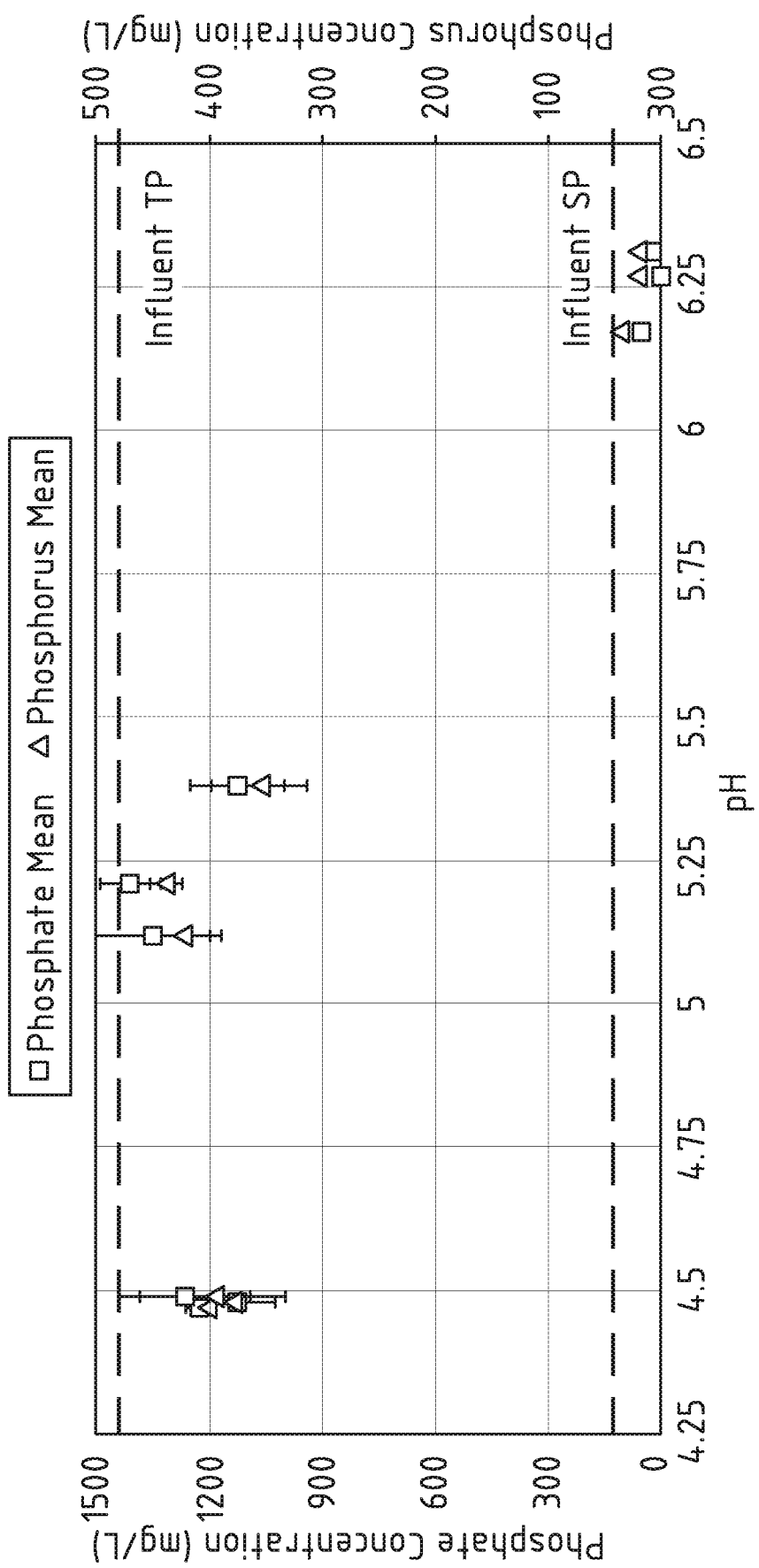
FIG. 3 shows the liberation of phosphorus into solution.

Experiments show that the liberation of phosphorus into solution provides good results (FIG. 3). The soluble phosphate and phosphorus concentrations are plotted against final measured pH for manure of a cow at 25° C. The lines TP and SP represent total phosphorus (TP) and soluble phosphorus (SP). The x-axis comprises pH, the y-axis comprises phosphate concentration (mg/L) and phosphorus concentration (mg/L). The square represents the phosphate mean and the tringle represents the phosphorus mean.

Figure 4:
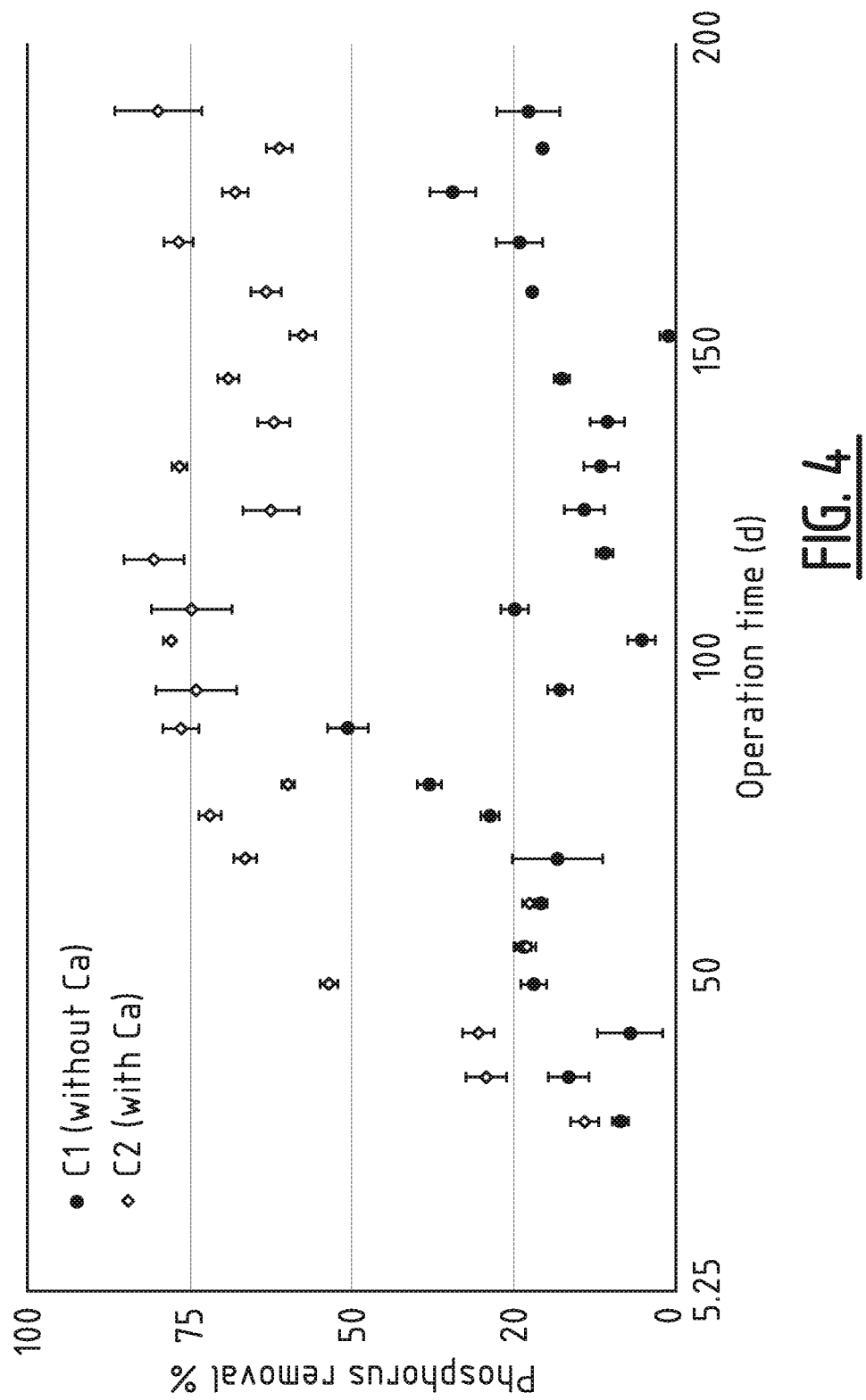
FIG. 4 shows the effect of addition of a calcium chloride to the anaerobic sludge reactor.

Further experiments show that a lab pilot provides good results for the recovery of phosphate (FIG. 4). FIG. 4 proves that the method and system according to the invention provide efficient and effective recovery of phosphate. It can be concluded that the addition of a compound comprising calcium increases the phosphorus removal. The compound comprising calcium was in this particular case $CaCO_3$. The x-axis represents the operation time in days (d) and the y-axis represents the phosphorus removal (%).

Further experiments show the influence of a calcium composition addition, wherein the addition of the calcium composition was tested in two 45 Litre anaerobic sludge reactors for 455 days (Table 1). The process and reaction conditions in both reactors were the same, except that to the first reactor the calcium composition was added and to the second reactor no compound comprising calcium was added.

It is noted that the composition comprising calcium did not include any phosphorus.

TABLE 1 influence of addition of compound comprising calcium

| Time | No calcium addition | | | | Calcium addition | | | |
|---|---|---|---|---|---|---|---|---|
| (days) | Pt in | sd | Pt out | sd | Pt in | sd | Pt out | sd |
| 27 | 527 | 1 | 482 | 4 | 514 | 11 | 442 | 1 |
| 34 | 529 | 8 | 442 | 7 | 543 | 8 | 384 | 7 |
| 41 | 504 | 13 | 468 | 11 | 502 | 8 | 350 | 4 |
| 49 | 484 | 0 | 378 | 8 | 471 | 5 | 219 | 1 |
| 55 | 538 | 4 | 411 | 1 | 540 | 0 | 415 | 6 |
| 62 | 542 | 3 | 429 | 1 | 403 | 1 | 311 | 2 |
| 69 | 475 | 24 | 388 | 7 | 488 | 4 | 164 | 2 |
| 76 | 505 | 2 | 360 | 3 | 508 | 1 | 142 | 2 |
| 81 | 490 | 7 | 304 | 1 | 487 | 0 | 195 | 1 |
| 90 | 489 | 0 | 241 | 8 | 485 | 14 | 115 | 0 |
| 96 | 502 | 7 | 412 | 2 | 523 | 28 | 136 | 1 |
| 104 | 473 | 6 | 448 | 4 | 480 | 4 | 106 | 0 |
| 109 | 471 | 0 | 353 | 7 | 467 | 1 | 118 | 7 |
| 118 | 488 | 6 | 435 | 1 | 501 | 17 | 97 | 1 |
| 125 | 476 | 7 | 408 | 8 | 494 | 12 | 185 | 4 |
| 132 | 492 | 6 | 436 | 6 | 531 | 3 | 123 | 0 |
| 139 | 497 | 10 | 444 | 4 | 503 | 6 | 191 | 2 |
| 146 | 497 | 5 | 410 | 1 | 487 | 6 | 150 | 0 |
| 153 | 464 | 1 | 459 | 5 | 469 | 1 | 198 | 3 |
| 160 | 472 | 0 | 460 | 2 | 585 | 10 | 215 | 1 |
| 168 | 531 | 3 | 403 | 13 | 552 | 6 | 129 | 2 |
| 176 | 518 | 5 | 339 | 9 | 585 | 3 | 187 | 3 |
| 183 | 545 | 4 | 433 | 1 | 526 | 9 | 204 | 1 |
| 189 | 494 | 24 | 382 | 1 | 477 | 25 | 96 | 1 |
| 195 | 548 | 3 | 415 | 8 | 549 | 27 | 138 | 2 |
| 202 | 472 | 8 | 398 | 5 | 499 | 2 | 307 | 4 |
| 209 | 492 | 6 | 344 | 9 | 532 | 9 | 241 | 5 |
| 216 | 464 | 9 | 204 | 3 | 610 | 0 | 96 | 3 |
| 223 | 492 | 16 | 120 | 1 | 488 | 2 | 92 | 2 |
| 230 | 438 | 4 | 116 | 3 | 483 | 8 | 96 | 1 |
| 237 | 471 | 11 | 92 | 3 | 519 | 6 | 101 | 1 |
| 244 | 391 | 7 | 96 | 3 | 496 | 4 | 106 | 8 |
| 251 | 362 | 1 | 104 | 2 | 383 | 3 | 110 | 3 |
| 258 | 392 | 25 | 105 | 5 | 406 | 11 | 226 | 1 |
| 265 | 455 | 7 | 122 | 1 | 523 | 8 | 114 | 1 |
| 272 | 419 | 5 | 102 | 0 | 481 | 1 | 101 | 1 |
| 279 | 386 | 16 | 92 | 1 | 411 | 4 | 110 | 1 |
| 286 | 437 | 26 | 101 | 8 | 448 | 12 | 125 | 4 |
| 320 | 451 | | 94 | 1 | 477 | | 99 | 0 |
| 336 | | | 83 | 2 | | | 81 | 1 |
| 356 | 654 | 30 | 146 | 3 | 606 | 8 | 132 | 3 |
| 369 | 591 | 0 | 585 | 6 | 546 | 9 | 141 | 1 |
| 404 | 529 | 4 | 504 | 1 | 529 | 4 | 379 | 1 |
| 456 | 563.75 | 11.25 | 223 | 7 | 564 | 11 | 223 | 3 |

In Table 1 Pt refers to total phosphorus present as solid or aqueous species. Pt in refers to the phosphorus entering the reactor as (diary) manure in mg/L, and Pt out refers to the phosphorus leaving the reactor in the effluent in mg/L. Furthermore, sd is the standard deviation of the analysis of two samples taken from the influent/effluent.

Table 1 shows that the addition of calcium helps to retain phosphorus in the anaerobic sludge reactor and to recover it form said reactor. Furthermore, this shows that calcium binds to phosphorus and forms solids which are separate by gravimetric induced separation. Calcium has also a positive effect on the retention of other solids, such as biomass, by bridging between negatively charged sites of different compounds with its divalent positive charge. This may induce agglomeration, which is enhancing gravimetric separation and retention in the anaerobic sludge reactor. Therefore, Table 1 shows that Pt out is affected by the addition of calcium.

Further experiments show that calcium addition may be performed to increase the concentration of calcium and therefore to increase the concentration of calcium ions.

Figure 2:
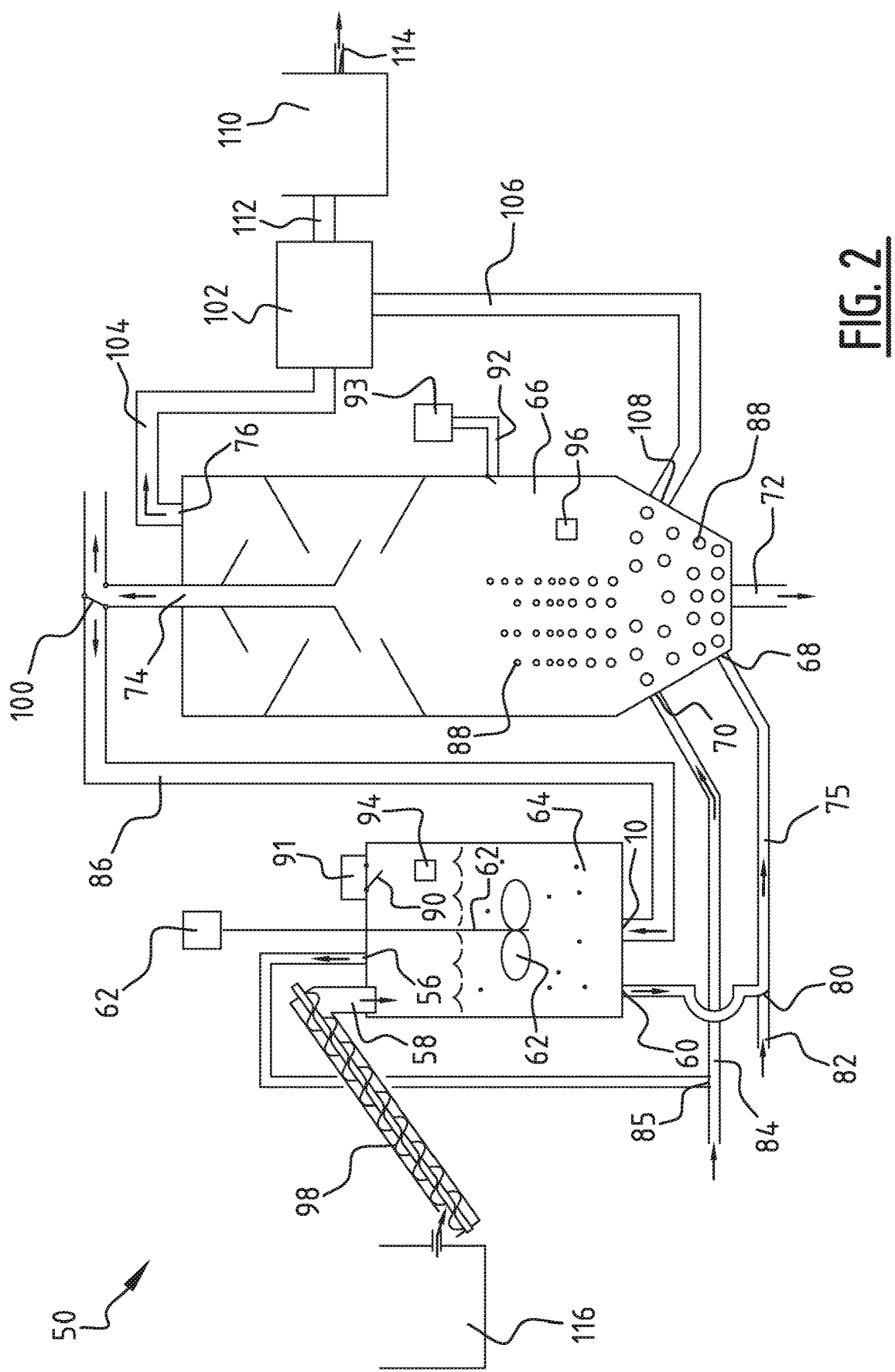
FIG. 2 shows an embodiment of the system capable of performing the method described in the description.

In this experiment the set up according to FIG. 2 was used. The effluent of the tank reactor was continuously pumped to the anaerobic tank reactor. The initial pH in the tank reactor was 5. This pH provides favouring conditions for acidogenic and acetogenic reactions over methanogenic reactions. To provide low starting pH (pH=5) different acids were tested, for example acetic acid, citric acid, and hydrogen chloride. It was found that the acetic acid provided sufficient recovery of phosphorus comprising compounds.

Preferably, the retention time in the tank reactor and/or anaerobic sludge reactor is long enough to keep the acid production higher than or equal to the acid consumption. Said conditions inhibit methanogens.

For example, the size of the tank reactor relative to the anaerobic sludge reactor may vary, such that a difference in loading of the reactor is achieved.

Further experiments showed that the system according to FIG. 2 enables sufficient production of organic acids in the tank reactor through degradation of organic matter. Furthermore, it was found that when an initial pH of about 5 and temperature between 45° C. and 80° C. of the waste stream provides effective and efficient degradation of organic matter. Furthermore, these conditions prevented further degradation of the organic acids. Furthermore, experiments showed that the preservation of the organic acids in the tank reactor was even more efficient when a buffer tank was used. Said buffer tank enables to condition the effluent of the tank reactor before it is provided to the anaerobic sludge reactor.

Further experiments showed that the addition of starch may steer the production of volatile fatty acids (VFA) and that this may keep the acidity level in the tank reactor at the desired pH of about 5. Furthermore, it was found that the addition of starch resulted in an increase of the VFA and $H_2$ production.

The present invention is by no means limited to the above described preferred embodiments and/or experiments thereof. The rights sought are defined by the following claims within the scope of which many modifications can be envisaged.

The invention claimed is:

1. A method for phosphate recovery from a waste stream, comprising the steps of:
providing a tank reactor;
providing acidogenic bacteria and/or acetogenic bacteria and providing the waste stream to the tank reactor;
hydrolysing the waste stream, and forming a reaction mixture with a compound comprising phosphate;
providing a gas flow to the reaction mixture for removing carbon dioxide from the reaction mixture;
providing the reaction mixture to an anaerobic sludge reactor;
removing the compound comprising phosphate from the reaction mixture within the anaerobic sludge reactor; and
removing gas from the reaction mixture within the anaerobic sludge reactor.

2. The method according to claim 1, wherein the waste stream is an animal manure waste stream.

3. The method according to claim 1, further comprising a step of adding a compound comprising calcium to the tank reactor.

4. The method according to claim 1, further comprising a step of adding a compound comprising calcium to the anaerobic sludge reactor.

5. The method according to claim 1, further comprising a step of separating the waste stream into a thick fraction and a thin fraction prior to the providing the waste stream to the tank reactor step, and wherein the thin fraction is provided to the tank reactor.

6. The method according to claim 5, wherein the step of separating comprises sieving the waste stream using a drum sieve.

7. The method according to claim 1, further comprising a step of providing a gas flow to the anaerobic sludge reactor prior to and/or in the step of removing a compound comprising phosphate from the reaction mixture within the anaerobic sludge reactor, wherein the gas flow provided to the anaerobic sludge reactor comprises gas from the step of providing a gas flow to the reaction mixture for removing carbon dioxide from the reaction mixture.

8. The method according to claim 1, further comprising a step of adding hydrogen gas to the anaerobic sludge reactor prior to and/or in the step of removing the compound comprising phosphate from the reaction mixture within the anaerobic sludge reactor.

9. The method according to claim 1, wherein the gas flow provided to the tank reactor comprises gas from the step of removing gas from the reaction mixture within the anaerobic sludge reactor, and/or
wherein the reaction mixture within the tank reactor has a pH in the range of 4 to 7, and wherein the reaction mixture within the anaerobic sludge reactor comprises a pH of at least 6.

10. The method according to claim 1, further comprising the step of heating the waste stream prior to the step of hydrolysing waste stream, wherein the waste stream is heated to at least 45° C.

11. The method according to claim 1, wherein the step of providing the waste stream to the tank reactor is performed at an organic loading rate in the range of 2 to 7 kg COD/m3·d.

12. The method according to claim 1, further comprising a step of removing a compound comprising nitrogen and/or a step of removing a compound comprising sulphur after and/or during the step of removing gas from the reaction mixture within the anaerobic sludge reactor.

13. The method according to claim 1, wherein the acidogenic bacteria and/or acetogenic bacteria is one or more selected from the group of: Thermoplasmatales, MBA03 of the class Clostridia, Hydrogenispora sp., Halocella sp., Fermentimonas sp., Proteiniphilum sp., Candidatus Methanoplasma sp., Methanoculleus ssp., Methanobrevibacter ssp., Sphaerochaeta ssp.

14. A system for phosphate recovering from a waste stream comprising:
a tank reactor for performing hydrolysis with acidogenic bacteria and/or acetogenic bacteria comprising:
a gas inlet;
a gas outlet;
a waste stream inlet; and
a reaction mixture outlet; and
an anaerobic sludge reactor, comprising:
a reaction mixture inlet, which is operatively coupled to the reaction mixture outlet of the tank reactor;
a gas inlet;
a particle outlet;
a gas outlet; and
a liquid outlet.

15. The system according to claim 14, wherein the gas outlet of the anaerobic sludge reactor is operatively coupled to the gas inlet of the tank reactor.

16. The system according to claim 14, wherein the system further comprises a screw press which is operatively coupled with the waste stream inlet of the tank reactor, and is configured to separate the waste stream into a thick fraction and a thin fraction, wherein the thin fraction is provided to the tank reactor, and/or
wherein the anaerobic sludge reactor further comprises at least one pneumatic valve which is configured to add a compound comprising calcium in a controlled manner.

17. The system according to claim 14, wherein the system further comprises heating means, wherein the heating means are operatively coupled to the tank reactor to heat the waste stream.

18. The system according to claim 14, wherein the system further comprises a nitrogen removal reactor for removing a compound comprising nitrogen, and/or
wherein the system further comprises a sulphur removal reactor for removing a compound comprising sulphur, wherein the sulphur removal reactor is aerated.

19. The system according to claim 14, further comprising a manure pit, wherein the manure pit is operatively coupled to the tank reactor.

20. A stable for phosphate recovering from a waste stream comprising the system according to claim 14.

* * * * *